United States Patent
Shindou et al.

(10) Patent No.: US 6,990,937 B2
(45) Date of Patent: Jan. 31, 2006

(54) VARIABLE VALVE CONTROL SYSTEM AND METHOD FOR AN INTERNAL COMBUSTION ENGINE

(75) Inventors: Shigeki Shindou, Yokohama (JP); Masaki Toriumi, Yokohama (JP); Tsuneyasu Nohara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 59 days.

(21) Appl. No.: 10/834,119

(22) Filed: Apr. 29, 2004

(65) Prior Publication Data

US 2004/0231624 A1 Nov. 25, 2004

(30) Foreign Application Priority Data

May 22, 2003 (JP) .......................... 2003-144625

(51) Int. Cl.
*F01L 1/34* (2006.01)

(52) U.S. Cl. ................................ 123/90.15; 123/90.16; 123/90.11

(58) Field of Classification Search ................ 123/90.1, 123/90.11, 90.12, 90.15, 90.16, 90.18, 198 D
See application file for complete search history.

(56) References Cited

U.S. PATENT DOCUMENTS

| 6,135,077 | A | * | 10/2000 | Moriya et al. | ........... 123/90.17 |
| 6,189,512 | B1 | * | 2/2001 | Kawasaki et al. | .......... 123/479 |
| 6,679,206 | B2 | * | 1/2004 | Takagi | ...................... 123/90.15 |

FOREIGN PATENT DOCUMENTS

JP         5-98916 A      4/1993

OTHER PUBLICATIONS

U.S. Appl. No. 10/953,365, filed Sep. 30, 2004, Shindou.

\* cited by examiner

*Primary Examiner*—Bibhu Mohanty
(74) *Attorney, Agent, or Firm*—Foley & Lardner LLP

(57) ABSTRACT

A variable valve control system for an internal combustion engine includes first and second variable valve control mechanisms capable of varying valve lift characteristics of one of an intake valve and exhaust valve, and a controller that controls the first and second variable valve control mechanisms. The controller includes a detecting section for detecting a malfunction of the first variable valve control mechanism, and a control section that controls the second variable valve control mechanism upon detection of the malfunction of the first variable valve control mechanism so that an intake valve opening timing coincides with or is retarded from an exhaust valve closing timing. A variable valve control method is also provided.

10 Claims, 6 Drawing Sheets

FIG.4
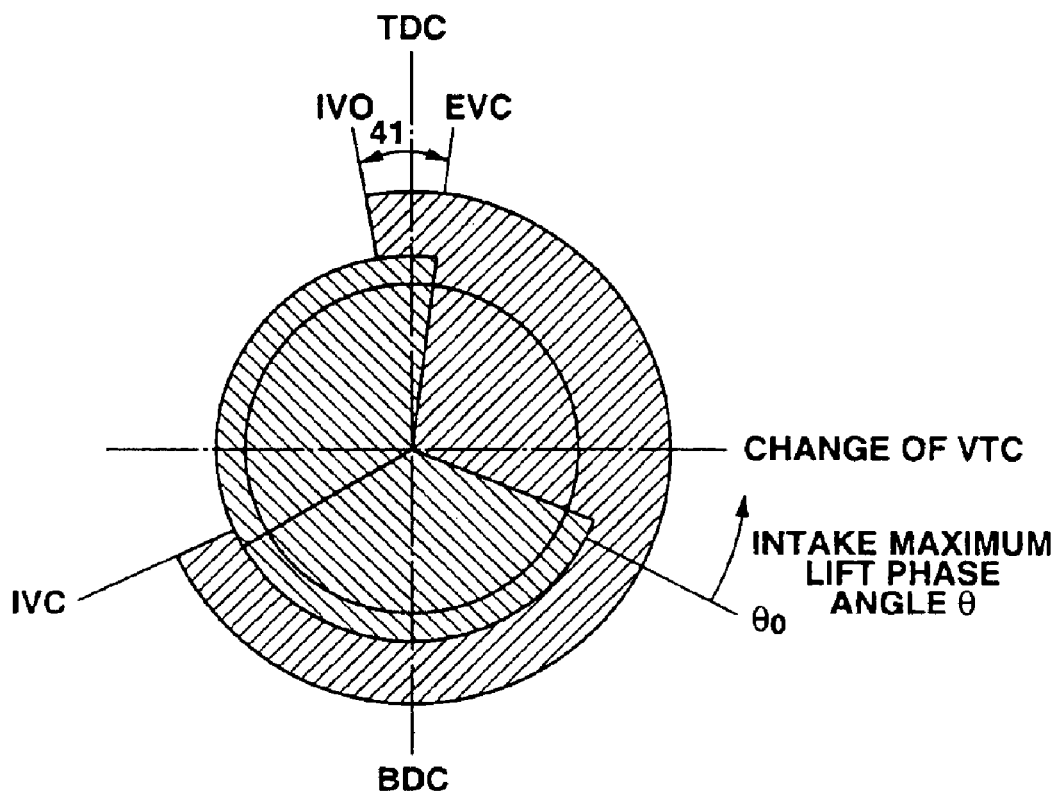
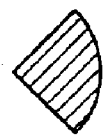 : INTAKE VALVE OPENING PERIOD
 : EXHAUST VALVE OPENING PERIOD $\theta > \theta_1$ $\theta = \theta_1$ $\theta < \theta_1$

VARIABLE VALVE CONTROL SYSTEM AND METHOD FOR AN INTERNAL COMBUSTION ENGINE

BACKGROUND OF THE INVENTION

The present invention relates to a variable valve control system for an internal combustion engine, which has two variable valve control mechanisms for varying valve lift characteristics of intake and exhaust valves, and more specifically to a failsafe technique upon malfunction of one of the variable valve control mechanisms. The present invention further relates to a variable valve control method for an internal combustion engine.

For the purpose of improving the output and fuel consumption of an internal combustion engine, there have heretofore been proposed various variable valve control systems for variably controlling the valve lift characteristics of intake and exhaust valves. For example, in a system having valve timing control mechanisms provided to the respective groups of engine cylinders for varying the valve timings of intake and exhaust valves, when a malfunction of one of the valve timing control mechanisms is detected, the valve timing of the other valve timing control mechanism is forcedly controlled so as to coincide with the actual valve timing of the valve timing control mechanism having been detected in malfunctioning, as disclosed in Unexamined Japanese Patent Application No. 5-98916.

SUMMARY OF THE INVENTION

In the meantime, in case, a plurality of variable valve control mechanisms are provided to predetermined intake and exhaust valves for variably controlling the valve lift characteristics thereof, a malfunction of one of the variable valve control mechanisms disables the engine to attain desired valve lift characteristics of the intake and exhaust valves, e.g., a valve overlap may possibly be caused inadvertently, thus increasing the exhaust gas remaining in the cylinders excessively and disabling the engine to attain a good combustion stability necessary for preventing a malfunction at starting and misfire.

It is accordingly an object of the present invention to provide a variable valve control system having a plurality of variable valve control mechanisms, which can attain such a performance ability and combustion stability that are sufficient for avoiding a defective or poor start and misfire even upon a malfunction of one of the variable valve control mechanisms.

It is a further object of the present invention to provide a variable valve control method for an internal combustion engine having a plurality of variable valve control mechanisms, which enables the engine to have the foregoing characters.

To achieve the above object, there is provided according to an aspect of the present invention a variable valve control system for an internal combustion engine comprising first and second variable valve control mechanisms capable of varying valve lift characteristics of one of an intake valve and exhaust valve, and a controller that controls the first and second variable valve control mechanisms, the controller including a detecting section for detecting a malfunction of the first variable valve control mechanism and a control section that controls the second variable valve control mechanism upon detection of a malfunction of the first variable valve control mechanism so that an intake valve opening timing coincides with or is retarded from an exhaust valve closing timing.

According to another aspect of the present invention, there is provided a variable valve control method for an internal combustion engine having first and second variable valve control mechanisms capable of varying valve lift characteristics of one of an intake valve and exhaust valve, the method comprising detecting a malfunction of the first variable valve control mechanism, and controlling the second variable valve control mechanism upon detection of the malfunction of the first variable valve control mechanism so that an intake valve opening timing coincides with or is retarded from an exhaust valve closing timing.

BRIEF DESCRIPTION OF THE DRAWINGS

FIG. 4 is a view for illustrating an operation of the variable valve control system of FIG. 1;

DESCRIPTION OF THE PREFERRED EMBODIMENTS

Figure 1:
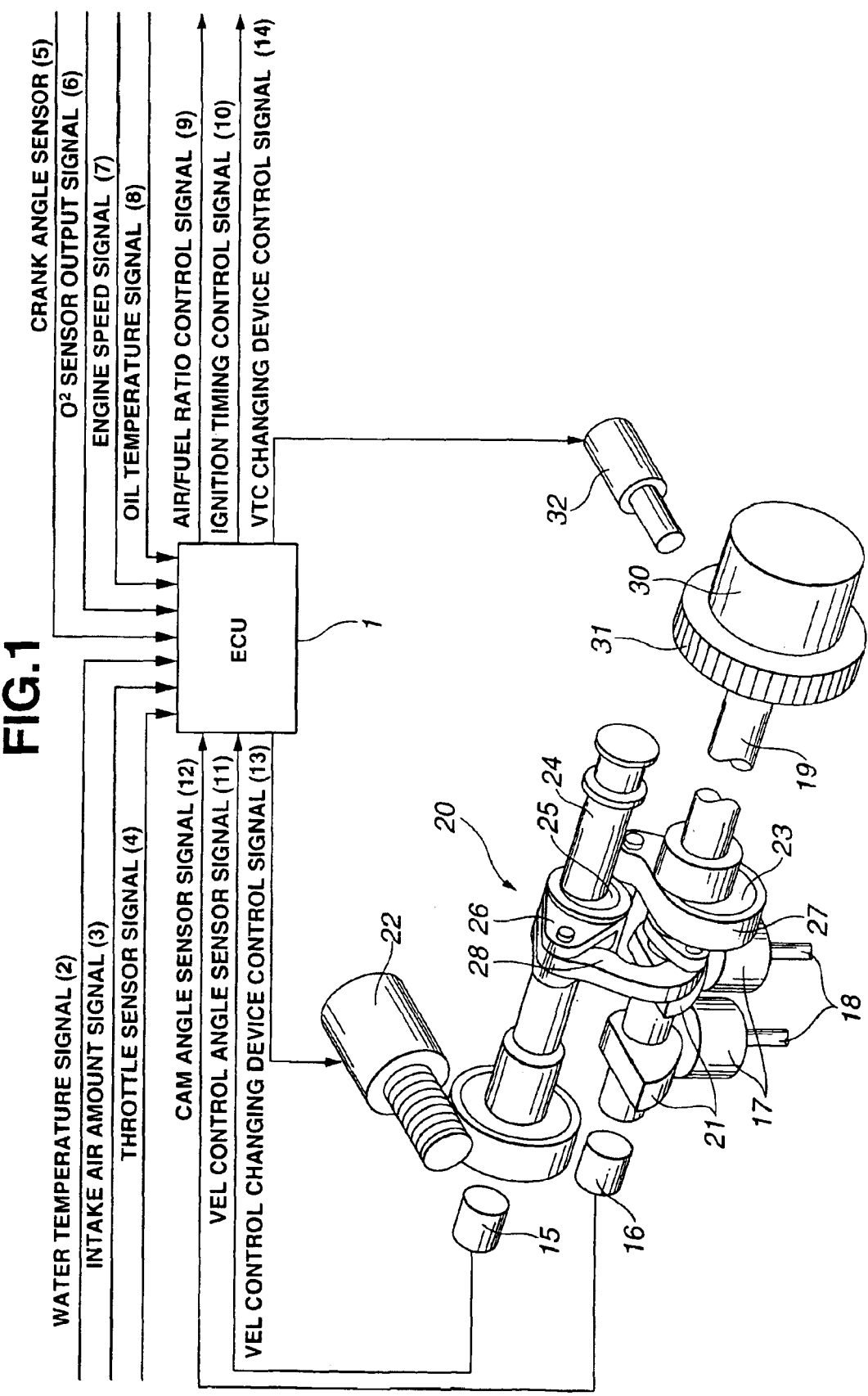
FIG. 1 is a perspective view of a variable valve control system for an internal combustion engine according to a first embodiment of the present invention.

Referring first to FIG. 1, an internal combustion engine is provided with a pair of intake valves 18 for each cylinder. To intake valves 18 are provided two variable valve control mechanisms capable of varying the valve lift characteristics of intake valves 18, i.e., valve timing control (VTC) mechanism 30 capable of varying the valve timing of intake valves 18 and valve event and lift (VEL) control mechanism 20 capable of varying the operation angle and lift of intake valves 18.

To intake cam shaft 19 is transmitted from a crankshaft (not shown) a rotational drive force by way of a pulley or sprocket (also not shown) so that intake cam shaft 19 is rotatable in timed relation to the crankshaft.

VEL control mechanism 20 includes a pair of oscillation cams 21 fixedly mounted on intake cam shaft 19 for driving respective intake valves 18 by way of valve lifters 17, circular drive cam 23 eccentrically and fixedly mounted on intake cam shaft 19, pivotal link 27 pivotally mounted on drive cam 23, control shaft 24 extending in parallel with intake cam shaft 19 and in the direction in which the cylinders (not shown) are arranged, circular control cam 25 eccentrically and fixedly mounted on control shaft 24, rocker arm 26 pivotally mounted on control cam 25 and having an end portion pivotally connected to a protruded arm portion of pivotal link 27, connecting link 28 having an upper end portion pivotally connected to another end portion of rocker arm 26 and a lower end portion pivotally connected to one of oscillation cams 21, and electric-powered VEL control changing device 22 that serves as an actuator for changing the rotational angle of control shaft 24.

With the above-described structure, when intake cam shaft 19 is rotated in timed relation to the crankshaft, drive cam 23 causes pivotal link 27 to move up and down.

Movement of pivotal link 27 causes rocker arm 26 to pivot about the axis of control cam 25. Connecting link 28 connected to rocker arm 26 thus causes oscillation cams 21 to oscillate and drive intake valves 18 to open and close by way of valve lifters 17.

Further, by varying the rotational or angular position of control shaft 24 by means of VEL control changing device 22, the axis of control cam 25 that is the pivotal axis of rocker arm 26 is varied, thus causing the initial position of oscillation cams 21 (i.e., the center phase of the oscillation angle) to be varied. This enables the intake operation angle and valve lift to be varied continuously with the center phase of the intake operation angle being maintained nearly constant.

Such VEL control mechanism 20 is compact and therefore excellent in the installability since rocker arm 26 and links 27, 28 are collectively disposed around intake cam shaft 19. Further, such VEL control mechanism 20 has a good durability and reliability in operation since many connecting portions of the constituent parts such as the bearing portions of drive cam 23 and pivotal link 27 and control cam 25 and rocker arm 26 are structured so as to be in surface-to-surface contact with each other and therefore lubrication thereof can be attained with ease and further since it does not require a biasing means such as return springs. Further, VEL control mechanism 20 is adapted for adoption to a direct-drive type valve operating system so that it can make higher the rotational limit with a simple and compact structure.

An example of VTC mechanism 30 is disclosed in Unexamined Japanese Patent Publication No. 5-98916, and VTC mechanisms of the type using helical splines and of the vane type are well known. Brief description being made thereto, VTC mechanism 30 includes outer rotor 31 having a cam pulley or sprocket rotatable in timed relation to the crankshaft and an inner rotor (not shown) disposed inside outer rotor 31 and rotatable with intake camshaft 19. The rotors are rotated relative to each other by means of hydraulic VTC changing device 32 thereby advancing or retarding the center phase of the intake valve operation angle (i.e., the phase at which the lift of the intake valve becomes maximum).

Engine control unit 1 is made up of a known digital computer consisting of CPU, ROM, RAM and an input/output interface and has a function of storing and executing various control processings which will be described hereinafter. To engine control unit 1 are inputted various signals such as water temperature signal 2 from a water temperature sensor, intake air amount signal 3 from an airflow meter, throttle sensor signal 4 from a throttle sensor, crank angle signal 5 from a crank angle sensor, $O^2$ sensor output signal 6 from an oxygen sensor disposed in an exhaust passage, engine speed signal 7 from an engine speed sensor, oil temperature signal 8 from an oil temperature sensor, VEL control angle sensor signal 11 from VEL control angle sensor 15 for detecting a rotational angle or an angular position of control shaft 24 and cam angle sensor signal 12 from cam angle sensor 16 for detecting a rotational angle or angular position of intake camshaft 19. Based on those signals, engine control unit 1 outputs control signals to various actuators, e.g., air/fuel ratio control signal 9, ignition timing control signal 10, VEL control changing device control signal 13 and VTC changing device control signal 14 to a fuel injection system, ignition system, VEL control changing device 22 and VTC changing device 32, respectively, thereby controlling the operations thereof.

Figure 3:
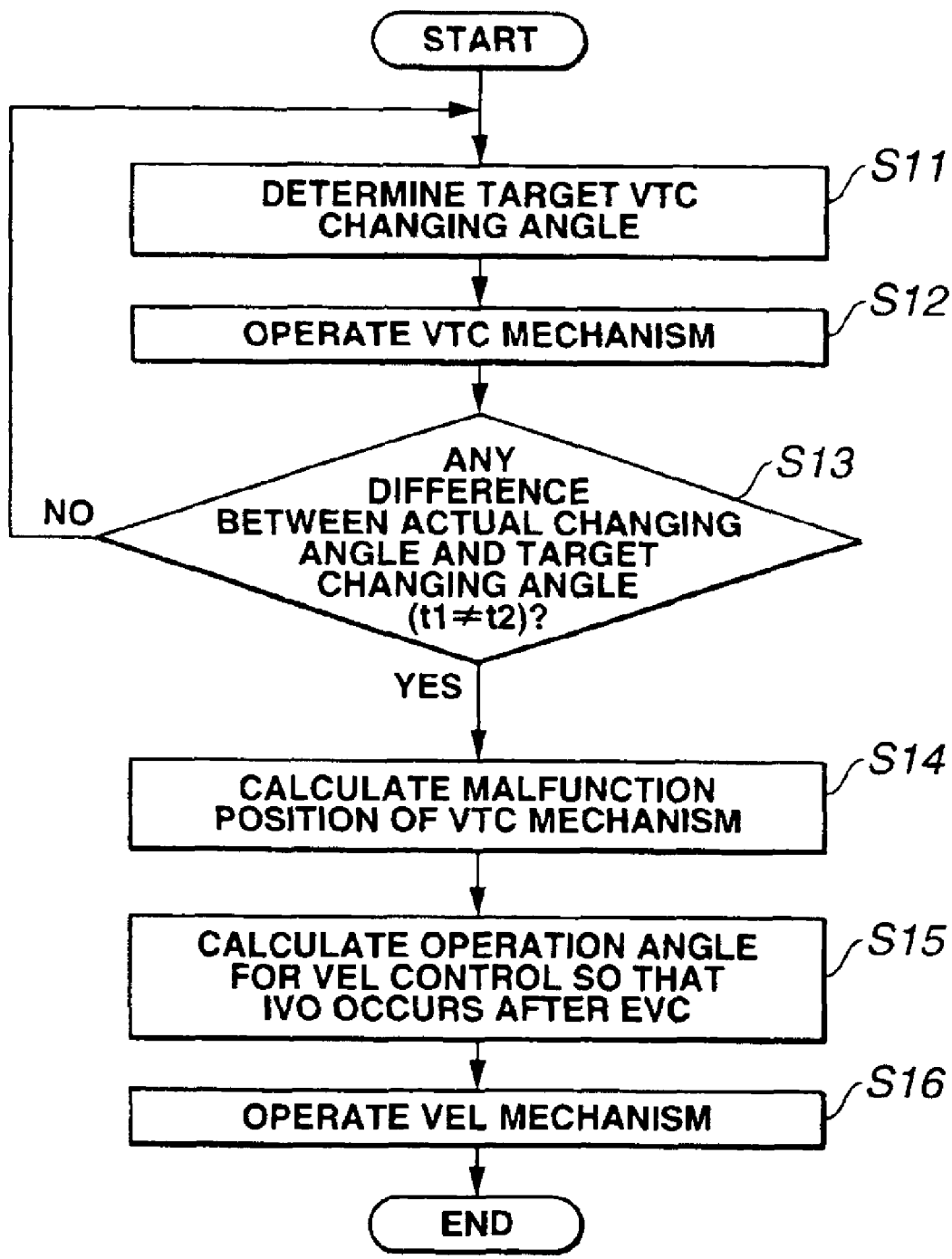
FIG. 3 is a flowchart of a control executed by the variable valve control system of FIG. 1.

Referring to FIG. 3, a control executed by the variable valve control system according to the first embodiment of the present invention will be described. In the following control processings are executed in engine control unit 1.

Figure 2:
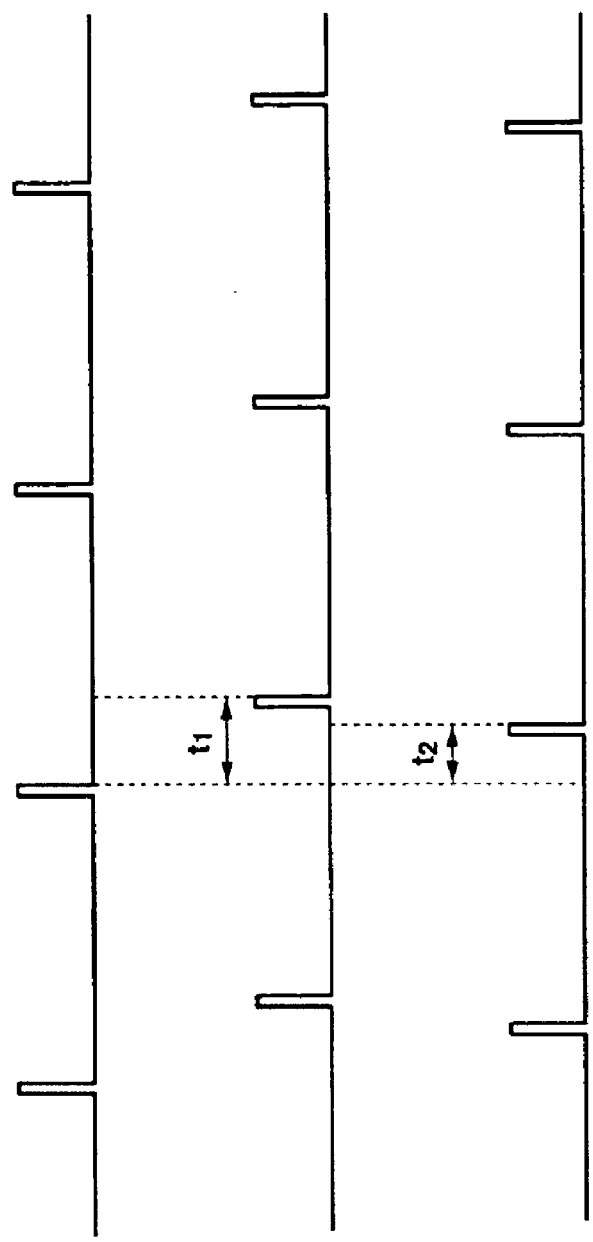
FIG. 2 is a time chart for illustrating detection of a malfunction of a valve timing control mechanism of the variable valve control system of FIG. 1.

Firstly, in step S11, a target changing angle that is a target value of a center phase of an intake valve operation angle to be attained by VTC mechanism 30 is determined based on an engine operating condition. The target changing angle corresponds to a target value t1 (refer to FIG. 2) of a phase difference between the crank angle sensor signal and the cam angle sensor signal. In step S12, a control signal corresponding to the target changing angle to be attained by VTC mechanism 30 is outputted to VTC changing device 32 thereby driving VTC mechanism 30 so as to attain the target changing angle.

In step S13, it is detected a condition in which VTC mechanism 30 cannot function or operate properly for some reason, i.e., it is detected a malfunction of VTC mechanism 30 (malfunction detecting means or section). For example, based on crank angle sensor signal 5 and cam angle sensor signal 12 is detected and calculated an actual changing angle of VTC mechanism 30, and by comparing the actual changing angle with the target changing angle a detection and judgment of malfunction is made. The actual changing angle corresponds to a difference t2 (refer to FIG. 2) between the crank angle sensor signal and the cam angle sensor signal, i.e., a phase difference between the crankshaft and camshaft 19. When t2 and t1 do not coincide with each other and a difference therebetween exceeds a predetermined value, it is determined that a malfunction of VTC mechanism 30 is caused and the control proceeds to step S14 where a control for avoiding a valve overlap by means of VEL control mechanism 20 is executed. Further, though not shown, the driver is warned of the malfunction of VTC mechanism 30 by means of a warning lamp or the like.

In step S14, based on crank angle sensor signal 5 and cam angle sensor signal 12, the malfunction position of VTC mechanism 30, i.e., center phase θ of the intake valve operation angle is calculated. As shown in FIG. 4, center phase θ of the intake valve operation angle is represented by an angle advanced from maximumly retarded phase $θ_0$ that is an initial position of VTC mechanism 30 and becomes larger as it is advanced increasingly.

In step S15, a target operation angle of VEL control mechanism 20 is calculated so that intake valve opening timing IVO coincides with (or is retarded from) exhaust valve closing timing EVC, i.e., so that valve overlap period 41 (refer to FIG. 4) during which both of the intake valves 18 and the exhaust valves are opened is eliminated. In step S16, a control signal corresponding to the target operation angle calculated in step S15 is outputted to VEL control changing device 22 thereby driving VEL control mechanism 20 so as to attain the target operation angle.

For example, in case a malfunction of VTC mechanism 30 is detected under a condition where valve overlap 41 exists as shown in FIG. 4, VEL control mechanism 20 is driven so as to attain a smaller operation angle and a smaller valve lift so that IVO is retarded toward EVC.

By this embodiment, in case a malfunction of VTC mechanism 30 is detected, VEL control mechanism 20 is driven so as to eliminate valve overlap 41 at once, thus making it possible to attain a good engine performance and a good combustion stability that are sufficient to prevent such a malfunction in starting and misfire that may otherwise be caused by an excess amount of exhaust gas remaining in the cylinders due to valve overlap 41.

Further, since VEL control changing device 22 is of the electric-powered type that is excellent in the responsiveness, the overlap can be eliminated rapidly at the time of occurrence of the malfunction.

Figure 5:
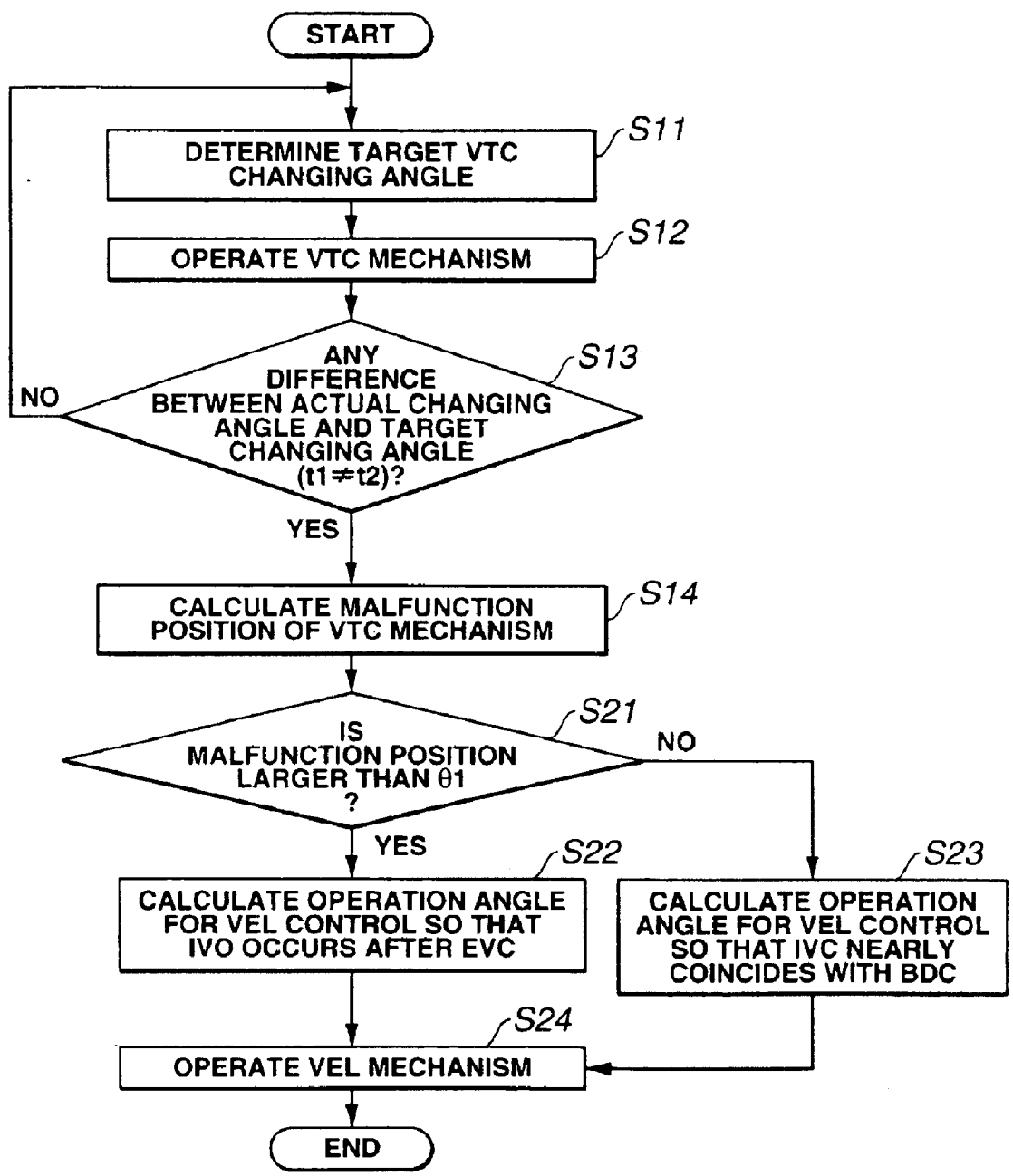
FIG. 5 is a flowchart of a control executed by a variable valve control system according to a second embodiment of the present invention.

Referring to FIG. 5, a control executed by the variable valve control system according to a second embodiment of the present invention will be described. The second embodiment is substantially the same as the first embodiment except for the control executed in ECU 1.

The control processings in steps S11 to S14 are the same as those of the first embodiment. Namely, in step S11, a target changing angle of VTC mechanism 30 is determined. In step S12, VTC mechanism 30 is driven so as to attain the target changing angle. If in step S13 a malfunction of VTC mechanism 30 is detected, the control proceeds to step S14 where a center phase θ of the intake valve operation angle, corresponding to the malfunction position of VTC mechanism 30 is calculated.

In the following steps S21 to S24, VEL control mechanism 20 is driven so as not to cause a valve overlap but to cause intake valve closure timing IVC to come closer to bottom dead center BDC.

Namely, in step S21, it is determined whether the center phase θ of the intake valve operation angle that is representative of the malfunction position is equal to or larger than reference center phase θ1. Reference center phase θ1 is the phase in the middle of the period between exhaust valve closure timing EVC and bottom dead center BDC and corresponds to the center phase that enables IVO to coincide with EVC and IVC to coincide with BDC.

Figure 6A:
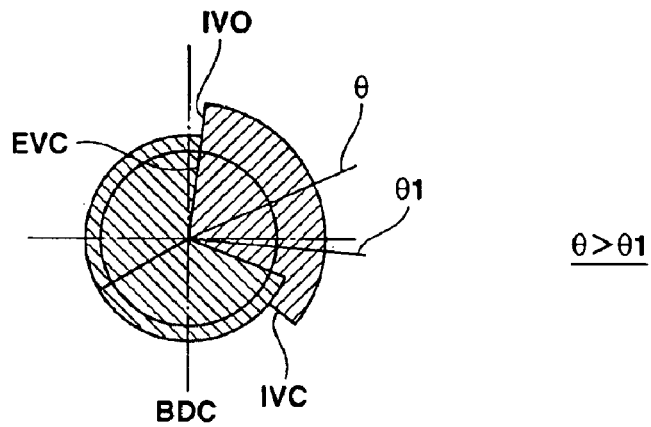
FIGS. 6A to 6C are views for illustrating an operation of the variable valve control system according to the second embodiment.
Figure 6B:
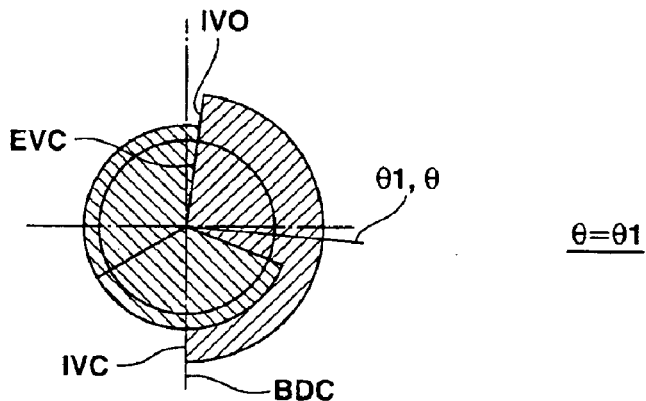

As shown in FIG. 6A, in case center phase θ of the intake valve operation angle is advanced from reference center phase θ1 (θ>θ1), IVC is advanced from BDC if the intake valve operation angle is of such one that causes IVO and EVC to coincide with each other. Accordingly, if the intake valve operation angle is increased in order to make IVC come closer to BDC, IVO is advanced from EVC, thus causing a possibility of a valve overlap. Accordingly, in this embodiment, in case center phase θ of the intake valve operation angle is advanced from reference center phase θ1, the control proceeds to step S22 where similarly to step S15 in the first embodiment the target operation angle of VEL control mechanism 20 that causes IVO to nearly coincide with or be retarded from EVC is calculated.

Figure 6C:
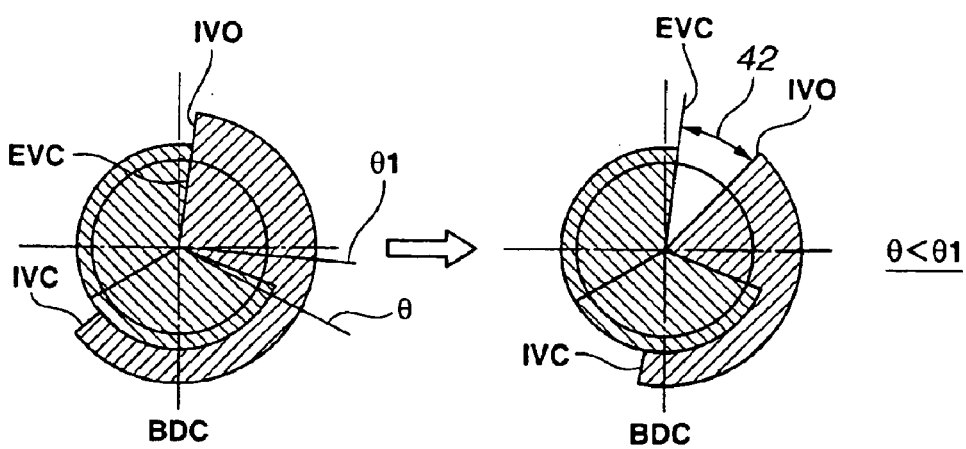

As shown in FIG. 6C, in case center phase θ of the intake valve operation angle is retarded from reference center phase θ1 (θ<θ1), IVC is retarded from BDC if the intake valve operation angle is of such one that causes IVO and EVC to coincide with each other. Accordingly, when the intake valve operation angle is made smaller in order to make IVC coincide with BDC, IVO is caused to go apart from EVC toward the retard side, thus increasing so-called minus overlap 42 but never causing a valve overlap. Thus, in case center phase θ of the intake valve operation angle is retarded from reference center phase θ1, the control proceeds to step S23 where a target operation angle of VEL control mechanism 20 that causes IVC to nearly coincide with bottom dead center BDC is calculated. Then, in step S24, VEL control mechanism 20 is driven so as to attain the target operation angle calculated in step S22 or S23.

By such a second embodiment, in addition to the similar effect attained by the first embodiment, it becomes possible to make IVC come closer to BDC without causing a valve overlap, thus making it possible to make the actual compression ratio higher thereby further improving the combustion stability.

The control processing shown in FIGS. 3 and 5 at the time of a malfunction of VTC mechanism 30 can be performed in all of the engine operation ranges or in a particular engine operation range. For example, at engine start, a malfunction in starting may possibly be caused when desired valve lift characteristics cannot be attained due to a malfunction of VTC mechanism 30. Accordingly, it will suffice to perform the control of FIGS. 3 and 5 only at engine start or at an engine operating range including engine start.

The entire contents of Japanese Patent Application P2003-144625 (filed May 22, 2003) are incorporated herein by reference.

Although the invention has been described above by reference to certain embodiments of the invention, the invention is not limited to the embodiment described above. Modifications and variations of the embodiment described above will occur to those skilled in the art, in light of the above teachings. For example, a malfunction of VEL control mechanism 20 may be detected and VTC mechanism 30 may be controlled or driven in a way as to eliminate a valve overlap upon detection of a malfunction of VEL control mechanism 20.

What is claimed is:

1. A variable valve control system for an internal combustion engine comprising:
   first and second variable valve control mechanisms capable of varying valve lift characteristics of one of an intake valve and exhaust valve; and
   a controller that controls the first and second variable valve control mechanisms;
   the controller including:
   a detecting section for detecting a malfunction of the first variable valve control mechanism; and
   a control section that controls the second variable valve control mechanism upon detection of a malfunction of the first variable valve control mechanism so that an intake valve opening timing coincides with or is retarded from an exhaust valve closing timing.

2. A variable valve control system according to claim 1, wherein the first variable valve control mechanism comprises a valve timing control mechanism capable of varying a valve timing of the intake valve, and the second variable valve control mechanism comprises a valve event and lift control mechanism capable of varying an operation angle and a valve lift of the intake valve continuously.

3. A variable valve control system according to claim 2, wherein the valve event and lift control mechanism comprises an intake camshaft rotatable in timed relation to a crankshaft of the engine, an oscillation cam fixedly mounted on the intake camshaft for driving the intake valve of the engine, a circular drive cam eccentrically and fixedly mounted on intake cam shaft, a pivotal link pivotally mounted on drive cam, a control shaft, a circular control cam eccentrically and fixedly provided to the control shaft, a rocker arm pivotally mounted on the control cam and having an end portion pivotally connected to a protruded arm portion of the pivotal link, a connecting link having an upper end portion pivotally connected to another end portion of the rocker arm and a lower end portion pivotally connected to the oscillation cam, and an actuator for changing a rotational angle of the control shaft.

4. A variable valve control system according to claim 3, wherein at the time of the malfunction of the first variable valve control mechanism and in case a center phase of an intake valve operation angle is retarded from a reference center phase that is a phase at the center between an exhaust valve closing timing and a bottom dead center, the controller controls the valve event and lift control mechanism so that the intake valve closing timing comes closer to the bottom dead center.

5. A variable valve control system according to claim 3, wherein at the time of the malfunction of the valve timing control mechanism and in case the center phase of the intake valve operation angle is advanced from a reference center phase that is a phase at the center between an exhaust valve closing timing and a bottom dead center, the controller controls the valve event and lift control mechanism so that the intake valve opening timing approximately coincides with the exhaust valve closing timing.

6. A variable valve control system according to claim 1, wherein the controller controls the first and second variable valve control mechanisms only at a particular engine operating condition including starting of the engine.

7. A variable valve control system for an internal combustion engine comprising:

first and second variable valve control mechanisms capable of varying valve lift characteristics of one of an intake valve and exhaust valve;

detecting means for detecting a malfunction of the first variable valve control mechanism; and control means for controlling the second variable valve control mechanism upon detection of the malfunction of the first variable valve control mechanism so that an intake valve opening timing coincides with or is retarded from an exhaust valve closing timing.

8. A variable valve control method for an internal combustion engine having first and second variable valve control mechanisms capable of varying valve lift characteristics of one of an intake valve and exhaust valve, the method comprising:

detecting a malfunction of the first variable valve control mechanism; and controlling the second variable valve control mechanism upon detection of the malfunction of the first variable valve control mechanism so that an intake valve opening timing coincides with or is retarded from an exhaust valve closing timing.

9. A variable valve control method according to claim 8, wherein the first variable valve control mechanism comprises a valve timing control mechanism capable of varying a valve timing of the intake valve, and the second variable valve control mechanism comprises a valve event and lift control mechanism capable of varying an operation angle and a valve lift of the intake valve continuously, and wherein at the time of the malfunction of the first variable valve control mechanism and in case the center phase of the intake valve operation angle is advanced from a reference center phase that is a phase at the center between the exhaust valve closing timing and a bottom dead center, the controlling comprises controlling the valve event and lift control mechanism so that the intake valve opening timing approximately coincides with the exhaust valve closing timing.

10. A variable valve control method according to claim 8, wherein the first variable valve control mechanism comprises a valve timing control mechanism capable of varying a valve timing of the intake valve, and the second variable valve control mechanism comprises a valve event and lift control mechanism capable of varying an operation angle and a valve lift of the intake valve continuously, and wherein at the time of the malfunction of the first variable valve control mechanism and in case the center phase of the intake valve operation angle is advanced from a reference center phase that is a phase at the center between an exhaust valve closing timing and a bottom dead center, the controlling comprises controlling the first and second variable valve control mechanisms only at a particular engine operating condition including starting of the engine.

* * * * *